Nov. 24, 1936.  R. MITTELMAN  2,062,186
PACKING
Filed Nov. 4, 1935
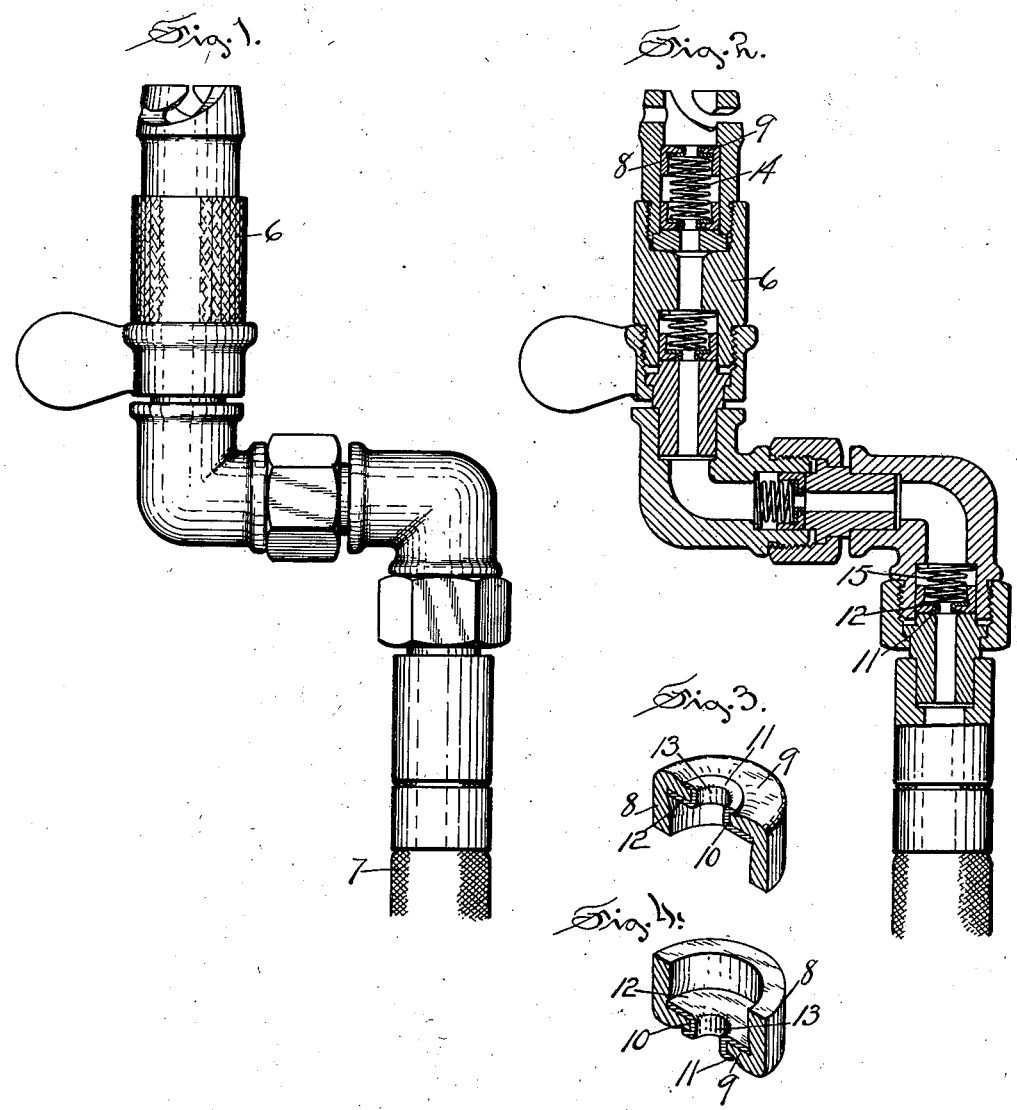
INVENTOR
Reuben Mittelman,
by
Arthur B. Jenkins.
ATTORNEY Patented Nov. 24, 1936

2,062,186

UNITED STATES PATENT OFFICE 2,062,186

PACKING

Reuben Mittelman, Hartford, Conn., assignor to The Auburn Leather Goods Company, Hartford, Conn., a corporation of Connecticut Application November 4, 1935, Serial No. 48,133

1 Claim. (Cl. 288—1)

My invention relates to that class of devices which are employed for filling or nearly filling passages for flow of liquid to regulate or cause such flow, and an object of my invention, among others, is to provide a device of this class that shall be simple in construction, that shall be extremely durable, and that shall be most efficient in operation.

One form of a device embodying my invention and in the construction and use of which the objects herein set out, as well as others, may be attained is illustrated in the accompanying drawing in which—

Figure 1 is a side view of the ejection end of a grease gun provided with my improved packing.

Figure 2 is a view partially in lengthwise central section through the same.

Figure 3 is an enlarged isometric perspective view in lengthwise central section through my improved packing looking at the outer surface of the bottom thereof.

Figure 4 is a similar view looking into said packing.

Packings of the type forming the subject matter of this application are commonly composed of leather or other similar fibrous material, this packing being of cup shape which is the type commonly employed in pistons for pumps for effecting flow of liquid, or air, or other fluid and also for regulating flow of fluid through passages in tubes and similar devices, and the invention is therefore not to be considered as confined to any particular type of apparatus.

As I have found this improved packing to be especially beneficial when employed in so-called grease guns used for lubricating purposes I have selected such implement for the purpose of disclosure of my invention herein, the ejection end of such a gun being shown in the drawing in which the numeral 6 denotes generally the nozzle of a grease gun of a construction in common use at the present time and which is composed of several parts which need no particular description herein. This nozzle is attached at the end of a tube 7 for conducting grease to the nozzle to be injected into openings leading to bearings, etc. Packings to regulate the flow of the grease through the nozzle are employed at different locations therein, and my improved packing is of particular advantage when employed at such places. This packing 8 is preferably composed of leather and is of cup shape comprising a side wall and a bottom 9. The bottom 9 of the cup has a central opening 10 for flow of fluid therethrough, this opening being of a size suitable for the particular use to which the packing is to be put.

This packing has heretofore been commonly made from leather, as this material has characteristics most suitable for the purposes of the packings, such packings however being comparatively short lived after the central openings are changed as to size, sometimes becoming smaller and at other times becoming larger, depending upon the particular use to which the packing is subjected, and the edges of the openings also become roughened and frayed as do also the edges of the cups, such cups also becoming distorted in shape.

My improved cup is constructed to avoid such objections and in effecting my purpose I provide the opening in the bottom 9 of the cup or packing 8 with a shield and I also provide the bottom of the cup on the inside with a shape retaining plate to maintain the form of the cup. As herein shown this device is partially in the form of an eyelet having a rounded lip on the outside of the bottom of the cup and a plate 12 on the inside of the bottom of the cup, these two parts being joined by a tube 13, the whole being in the form of an eyelet with a broadened flange on one side thereof. The plate 12 is of a size substantially that of the inside of the cup, and when the lip 11 is overturned to secure the eyelet in place the shape of the cup is maintained indefinitely, there being no chances of distortion from the fact that the plate 12 maintains such shape. The hole through the eyelet is always of uniform size permitting an even flow of fluid therethrough.

When the packing is employed in connection with the plunger of a pump, the eyelet is readily threaded to receive the pump rod which is screwed into the eyelet and washers and nuts for securing the parts together are therefore done away with.

The plate 12 is also adapted to receive a spring 14 which is commonly used in the structure of grease guns and as shown in Fig. 2 of the drawing, the packing nearest the tip of the nozzle being composed of two members with their open ends facing each other. In case a single cup is employed, as shown at 15, one end of the spring is seated against the plate 12 of the packing and the opposite end of the spring is seated against a shoulder within the tube.

In accordance with the provisions of the patent statutes I have described the principles of operation of my invention together with the device which I now consider to represent the best embodiment thereof; but I desire to have it understood that the invention may be carried out by other means and applied to uses other than those above set out.

I claim:

For use in sealing a joint between pipes, wherein the adjacent ends of the pipe bores of contiguous pipes are of different diameters, a packing comprising a cup of fibrous material having a passage through the bottom thereof registering with the smaller pipe bore, and means for reinforcing the cup and preventing wear on the walls of the passage comprising a flat disk coextensive with the bottom of the cup with a central annular flange adapted to extend through the passage in the cup and be peened over on the opposite side of the cup.

REUBEN MITTELMAN.